US012141931B2

(12) United States Patent
Kodama

(10) Patent No.: US 12,141,931 B2
(45) Date of Patent: Nov. 12, 2024

(54) SUPPORTING APPARATUS, DESIGN SUPPORTING SYSTEM, AND NON-TRANSITORY COMPUTER READABLE MEDIUM STORING DESIGN SUPPORTING PROGRAM

(71) Applicant: FUJIFILM Business Innovation Corp., Tokyo (JP)

(72) Inventor: Kakeru Kodama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 634 days.

(21) Appl. No.: 17/385,955

(22) Filed: Jul. 27, 2021

(65) Prior Publication Data

US 2022/0292792 A1 Sep. 15, 2022

(30) Foreign Application Priority Data

Mar. 11, 2021 (JP) ................................. 2021-039481

(51) Int. Cl.
*G06F 30/10* (2020.01)
*G06T 19/20* (2011.01)

(52) U.S. Cl.
CPC .............. *G06T 19/20* (2013.01); *G06F 30/10* (2020.01)

(58) Field of Classification Search
CPC .. G06F 30/10; G06F 2111/20; G06F 2119/18; G06F 30/17; G06F 2111/10; G06T 19/20; G06T 2200/24; G06T 2219/2008
See application file for complete search history.

(56) References Cited

U.S. PATENT DOCUMENTS

2003/0189566 A1    10/2003  Fuki et al.
2015/0293525 A1*   10/2015  Yamamoto ......... G05B 19/4097
                                              702/182

FOREIGN PATENT DOCUMENTS

| JP | 109300145 | 11/1997 |
| JP | 2003296383 | 10/2003 |
| JP | 2010125511 | 6/2010 |
| JP | 2011253269 | 12/2011 |
| KR | 20180003193 A * | 1/2018 |

OTHER PUBLICATIONS

C. J. Barnes, A Methodology for the Concurrent Design of Products and Their Assembly Sequence, Sep. 1999, Cranfield University, UK, School of Industrial and Manufacturing Science, Ph. D. Thesis, pp. 1-161 (Year: 1999).*

* cited by examiner

*Primary Examiner* — Jeffery A Brier
(74) *Attorney, Agent, or Firm* — JCIPRNET

(57) ABSTRACT

A design supporting apparatus includes a processor configured to sort three-dimensional models of respective parts included in a module where plural parts are combined for each type of the parts and execute processing of displaying results of determination of whether or not the respective parts meet predetermined requirements related to assemblability for each type of the parts, the results being determined using the three-dimensional models, for each part in predetermined display forms according to the results of the determination.

15 Claims, 14 Drawing Sheets

FIG. 5

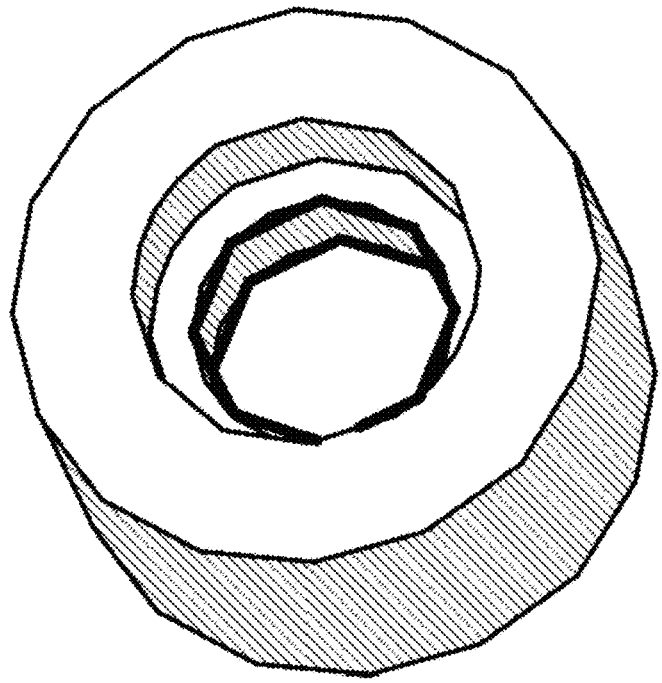

ASSEMBLED GEAR
REQUIREMENT CHECK

| REQUIREMENT ID | REQUIREMENT NAME | CHECK RESULT REQUIREMENT CONTENTS | RESULT | DIAGRAM |
|---|---|---|---|---|
| 000010 | PREVENTING INJURY TO WORKER | 1. NO SHARP (LESS THAN 90°) EDGE<br>2. SATISFYING FOLLOWINGS IN CASE WHERE THERE IS SHARP (LESS THAN 90°) PORTION<br>・ENSURING SAFE GRIP PORTION<br>・IN CASE WHERE THERE IS SHARP (LESS THAN 90°) PORTION ON GRIP PORTION<br>--INSTRUCTING R1 OR MORE TO BE GIVEN TO TIP OF SHARP PORTION TO BE GRIPPED<br>(SUPPLEMENT) PORTION TO BE TOUCHED BY CUSTOMER SHOULD CONFORM TO SAFETY GUIDE | ○ | OPEN |
| 000020 | SIZE OF PART CONSIDERING WORKABILITY | 1. OUTER DIAMETER OF φ10 OR MORE (RECOMMENDED)<br>2. CAPABLE OF PERFORMING GRIP/ASSEMBLY WORK WITHOUT REQUIRING STANDARD/SPECIALIZED TOOLS AND THE LIKE | / | OPEN |
| 000070 | EASY ASSEMBLY WORK | 1. NO FRONT/BACK AND NO DIRECTIONALITY IN LEFT-RIGHT DIRECTION<br>2. PROVIDING MEASURE FOR PREVENTING REVERSE ASSEMBLY IN CASE WHERE THERE IS DIRECTIONALITY<br>(SPECIFIC EXAMPLE) HOLLOW SHAPE CHANGING (RIBS, RIMS, AND BEARING PORTIONS) | ○ | OPEN |
| 000090 | EASY PHASE ALIGNMENT | 1. TAKING FOLLOWING MEASURE ACCORDING TO TYPE OF MATING PART<br>1-1. MATING PART IS METAL SHAFT: D-HOLE + MARK FOR PHASE ALIGNMENT (SHAPE THAT CAN BE RECOGNIZED IN APPEARANCE)<br>1-2. MATING PART IS RESIN SHAFT: DOUBLE D-HOLE | ○ | OPEN |
| 000100 | EASY PHASE ALIGNMENT | 1. MARK FOR PHASE ALIGNMENT<br>(SHAPE THAT CAN BE RECOGNIZED IN APPEARANCE)<br>(SUPPLEMENT) ARROW, △ MARK | ○ | OPEN |
| 000110 | EASY PHASE ALIGNMENT | 2. DOUBLE D-SHAFT<br>(SHAPE THAT CAN BE RECOGNIZED IN APPEARANCE)<br>3. SHAFT-SHAPED PORTION THAT CAN BE ASSEMBLED SINCE PHASE ALIGNMENT WITH MATING PART IS NOT REQUIRED (RECOMMENDED EXAMPLE) EMPLOYING COUPLING METHOD (BORUTO: 807E-59530) | ○ | OPEN |
| 000130 | EASY POSITIONING WORK | 1. INNER DIAMETER HOLE AND SHAFT TIP PORTION<br>(SHAFT IS FORMED ON GEAR) CORRESPOND TO FOLLOWINGS<br>PART (INNER DIAMETER HOLE, SHAFT TIP): C0.5 OR MORE<br>SHAFT TIP OF MATING PART (METAL): C1.0 OR MORE<br>SHAFT TIP OF MATING PART (RESIN): C0.5 OR MORE<br>(SUPPLEMENT) PLEASE ALSO REFER TO SHAFT REQUIREMENTS | / | OPEN |

FIG. 6

| REQUIREMENT ID | REQUIREMENT NAME | CHECK RESULT | | DIAGRAM |
|---|---|---|---|---|
| | | REQUIREMENT CONTENTS | RESULT | |
| 000010 | PREVENTING INJURY TO WORKER | 1. NO SHARP (LESS THAN 90°) EDGE | 0 | OPEN |
| | | 2. SATISFYING FOLLOWINGS IN CASE WHERE THERE IS SHARP (LESS THAN 90°) PORTION<br>· ENSURING SAFE GRIP PORTION<br>· IN CASE WHERE THERE IS SHARP (LESS THAN 90°) PORTION ON GRIP PORTION<br>·· INSTRUCTING R1 OR MORE TO BE GIVEN TO TIP OF SHARP PORTION TO BE GRIPPED<br>(SUPPLEMENT) PORTION TO BE TOUCHED BY CUSTOMER SHOULD CONFORM TO SAFETY GUIDE | - | |
| 000020 | SIZE OF PART CONSIDERING WORKABILITY | 1. OUTER DIAMETER OF φ10 OR MORE (RECOMMENDED) | 0 | OPEN |
| | | 2. CAPABLE OF PERFORMING GRIP/ASSEMBLY WORK WITHOUT REQUIRING STANDARD/SPECIALIZED TOOLS AND THE LIKE | - | |
| 000070 | EASY ASSEMBLY WORK | 1. NO FRONT/BACK AND NO DIRECTIONALITY IN LEFT-RIGHT DIRECTION | 0 | OPEN |
| | | 2. PROVIDING MEASURE FOR PREVENTING REVERSE ASSEMBLY IN CASE WHERE THERE IS DIRECTIONALITY<br>(SPECIFIC EXAMPLE) HOLLOW SHAPE CHANGING (RIBS, RIMS, AND BEARING PORTIONS) | - | |
| 000090 | EASY PHASE ALIGNMENT | 1. TAKING FOLLOWING MEASURE ACCORDING TO TYPE OF MATING PART<br>1-1. MATING PART IS METAL SHAFT: D-HOLE + MARK FOR PHASE ALIGNMENT (SHAPE THAT CAN BE RECOGNIZED IN APPEARANCE) | 0 | OPEN |
| | | 1-2. MATING PART IS RESIN SHAFT: DOUBLE D-HOLE | 0 | |
| 000100 | EASY PHASE ALIGNMENT | 1. MARK FOR PHASE ALIGNMENT<br>(SHAPE THAT CAN BE RECOGNIZED IN APPEARANCE)<br>(SUPPLEMENT) ARROW, △ MARK | 0 | OPEN |
| 000110 | EASY PHASE ALIGNMENT | 1. D-SHAFT + MARK FOR PHASE ALIGNMENT<br>(SHAPE THAT CAN BE RECOGNIZED IN APPEARANCE) | 0 | OPEN |
| | | 2. DOUBLE D-SHAFT | 0 | |
| | | 3. SHAFT-SHAPED PORTION THAT CAN BE ASSEMBLED SINCE PHASE ALIGNMENT WITH MATING PART IS NOT REQUIRED<br>(RECOMMENDED EXAMPLE) EMPLOYING COUPLING METHOD<br>(BORUTO: 807E 59530) | 0 | |
| 000130 | EASY POSITIONING WORK | 1. INNER DIAMETER HOLE AND SHAFT TIP PORTION (SHAFT IS FORMED ON GEAR) CORRESPOND TO FOLLOWINGS<br>PART (INNER DIAMETER HOLE, SHAFT TIP): C0.5 OR MORE<br>SHAFT TIP OF MATING PART (METAL): C1.0 OR MORE<br>SHAFT TIP OF MATING PART (RESIN): C0.5 OR MORE<br>(SUPPLEMENT) PLEASE ALSO REFER TO SHAFT REQUIREMENTS | 1 | OPEN |

FIG. 7

| USER ID | NAME | SUB | PART NUMBER | FILE NAME | CATEGORY | MODIFIED PORTION |
|---|---|---|---|---|---|---|
| fx32182 | YAMATANI HANAKO | DRIVE | 987E 01312 | BEARING_BRUSH | BEARING_013 | 0 |
| fx26101 | FUJI TARO | DRIVE | 807E 62540 | GEAR_AUGER_CC | GEAR_807 | 1 |
| fx26101 | FUJI TARO | DRIVE | 807E 62421 | GEAR_CAM_1901 | GEAR_807 | 1 |
| fx26101 | FUJI TARO | DRIVE | TBD | GEAR_DRIVE_ESE | GEAR_807 | 1 |
| fx26101 | FUJI TARO | DRIVE | 013E 42630 | BEARING_BRUSH | BEARING_013 | 0 |
| fx26101 | FUJI TARO | DRIVE | 013E 49810 | BEARING_GEAR_ | BEARING_013 | 0 |
| fx26101 | FUJI TARO | DRIVE | 013E 49650 | BEARING_BTR_1S | BEARING_013 | 0 |
| fx32182 | YAMATANI HANAKO | Other | 123E045678 | GEAR_IDLE_DISP | GEAR_007 | 0 |
| fx32182 | YAMATANI HANAKO | Other | 234E056789 | BEARING_SEAL_ | BEARING_013 | 0 |

SUPPORTING APPARATUS, DESIGN SUPPORTING SYSTEM, AND NON-TRANSITORY COMPUTER READABLE MEDIUM STORING DESIGN SUPPORTING PROGRAM

CROSS-REFERENCE TO RELATED APPLICATIONS

This application is based on and claims priority under 35 USC 119 from Japanese Patent Application No. 2021-039481 filed Mar. 11, 2021.

BACKGROUND

(i) Technical Field

The present invention relates to a design supporting apparatus, a design supporting system, and a non-transitory computer readable medium storing a design supporting program.

(ii) Related Art

JP2011-253269A proposes a three-dimensional model design supporting system. The three-dimensional model design supporting system includes a design rule storage unit in which a design rule using the mounting direction of a three-dimensional model is registered, and a three-dimensional model storage unit in which the names, types, directions, assembly order, adjacent information, and the like of parts output from the three-dimensional model of a product are registered. The three-dimensional model design supporting system checks the design rule using the mounting direction of the three-dimensional model, and notifies a worker whether or not the three-dimensional model violates the design rule.

JP2003-296383A proposes a technique in which a computer body recognizes the entire three-dimensional model without attribute information, specifies a corresponding part, extracts a feature quantity included in the three-dimensional model from the specified part, applies a design rule stored in a design rule database to the extracted feature quantity, and determines whether or not the three-dimensional model meets the design rule.

JP1997-300145A proposes an assembly evaluation apparatus including: a three-dimensional model-information extraction unit extracts the data of part names, materials, shapes, dimensions, and thicknesses, the data according to faces, the data of screw holes, and the like from the three-dimensional model data of parts of a three-dimensional data design unit as the part data of the parts; an assembly information extraction unit acquires constraint conditions, an assembly reference plane, constraint dimensions, the interference of the parts, an assembly order, a parent-child relationship of the parts from assembly data obtained from an assembly creation unit; an evaluation discrimination unit discriminates conditions for evaluation items from the three-dimensional model data and the assembly data and finds evaluation points and man-hours; a calculation unit totalizes the number of the evaluation points and the man-hours from the results of the discrimination; and a display unit or a printer unit is used to display or print out assemblability evaluation results.

SUMMARY

Aspects of non-limiting embodiments of the present disclosure relate to a design supporting apparatus, a design supporting system, and a non-transitory computer readable medium storing a design supporting program that can visually check the results of determination of whether or not parts meet requirements for assemblability for each part.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a design supporting apparatus including a processor configured to sort three-dimensional models of respective parts included in a module where a plurality of parts are combined for each type of the parts and execute processing of displaying results of determination of whether or not the respective parts meet predetermined requirements related to assemblability for each type of the parts, the results being determined using the three-dimensional models, for each part in predetermined display forms according to the results of the determination.

BRIEF DESCRIPTION OF THE DRAWINGS

Exemplary embodiment(s) of the present invention will be described in detail based on the following figures, wherein:

FIG. 5 is a diagram showing an example of the display of results of the determination of a determination unit;

FIG. 6 is an enlarged view of check results of FIG. 5;

FIG. 7 is a diagram showing an example in which results of determination for the respective parts of the assembly are displayed as a part list;

DETAILED DESCRIPTION

Figure 1:
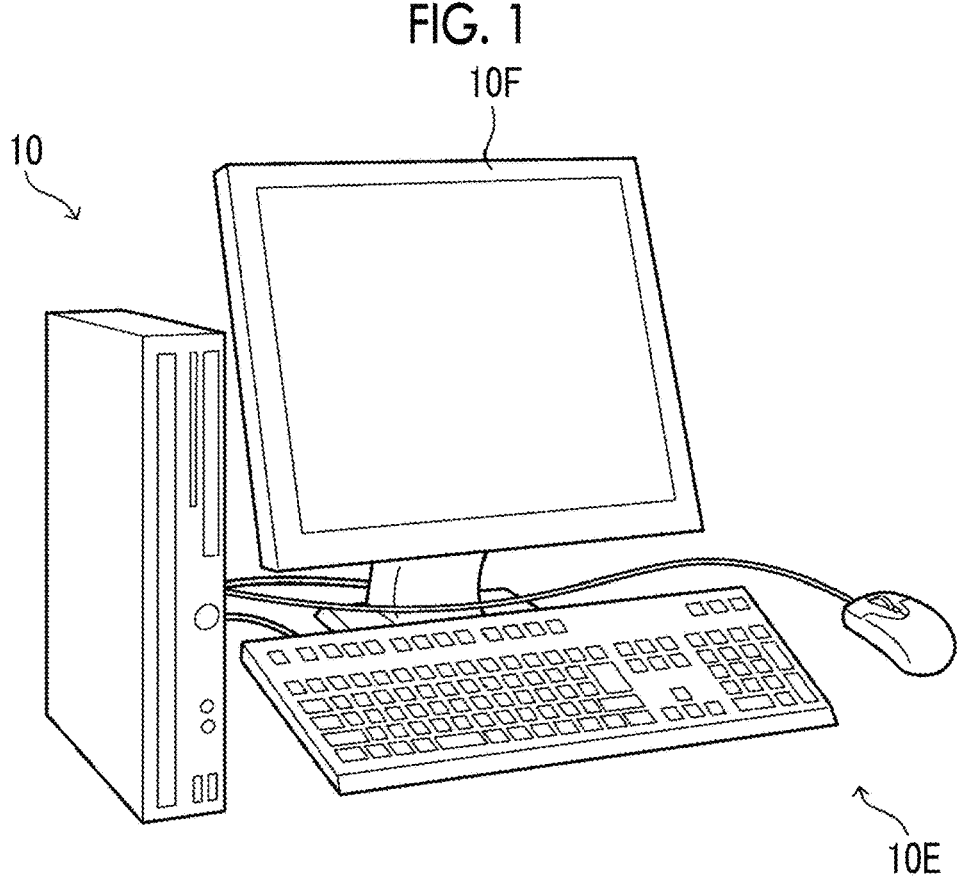
FIG. 1 is a diagram showing an example of the configuration of a design supporting apparatus according to the present exemplary embodiment.

An example of an exemplary embodiment of the present invention will be described in detail below with reference to the drawings. FIG. 1 is a diagram showing an example of the configuration of a design supporting apparatus according to this exemplary embodiment.

The design supporting apparatus 10 according to this exemplary embodiment is formed of a so-called general-purpose personal computer (PC) that includes a display unit 10F and an operation unit 10E, such as a keyboard and a mouse. The design supporting apparatus 10 executes image processing on image information that represents an image displayed on the display unit 10F.

Figure 2:
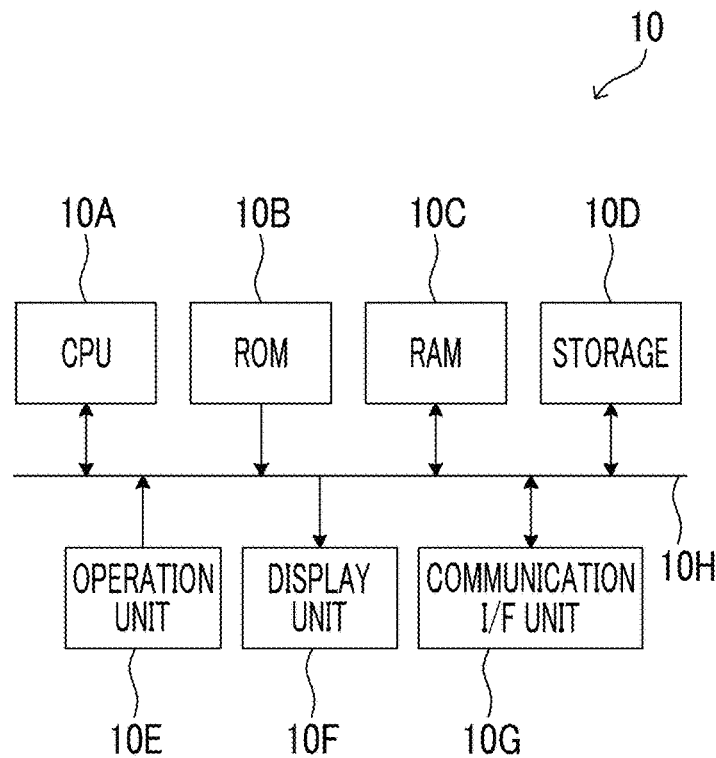
FIG. 2 is a block diagram showing the configuration of a major portion of an electrical system of the design supporting apparatus according to this exemplary embodiment.

FIG. 2 is a block diagram showing the configuration of a major portion of an electrical system of the design supporting apparatus 10 according to this exemplary embodiment.

The design supporting apparatus 10 includes a central processing unit (CPU) 10A as an example of a processor, a read only memory (ROM) 10B, a random access memory (RAM) 10C, a storage 10D, the operation unit 10E, the display unit 10F, and a communication interface (I/F) unit 10G. The CPU 10A takes charge of the overall operation of the design supporting apparatus 10. Various control programs, various parameters, and the like are stored in the ROM 10B in advance. The RAM 10C is used as a work area or the like in a case where the various programs are executed by the CPU 10A. Various data, application programs, and the like are stored in the storage 10D. The operation unit 10E is used to input various types of information. The display unit 10F is used to display various types of information. The communication I/F unit 10G is adapted to be connectable to an external device, and transmits and receives various data to and from the external device. The respective units of the above-mentioned design supporting apparatus 10 are electrically connected to each other by a system bus 10H. The storage 10D is applied as a storage unit in the design supporting apparatus 10 according to this exemplary embodiment. However, the storage unit is not limited thereto and other non-volatile storage units, such as a hard disk and a flash memory, may be applied.

With the above-mentioned configuration, the design supporting apparatus 10 according to this exemplary embodiment uses the CPU 10A to have access to the ROM 10B, the RAM 10C, and the storage 10D, to acquire various data through the operation unit 10E, and to display various types of information on the display unit 10F. Further, the design supporting apparatus 10 uses the CPU 10A to control the transmission and reception of various data that is performed through the communication I/F unit 10G.

Figure 3:
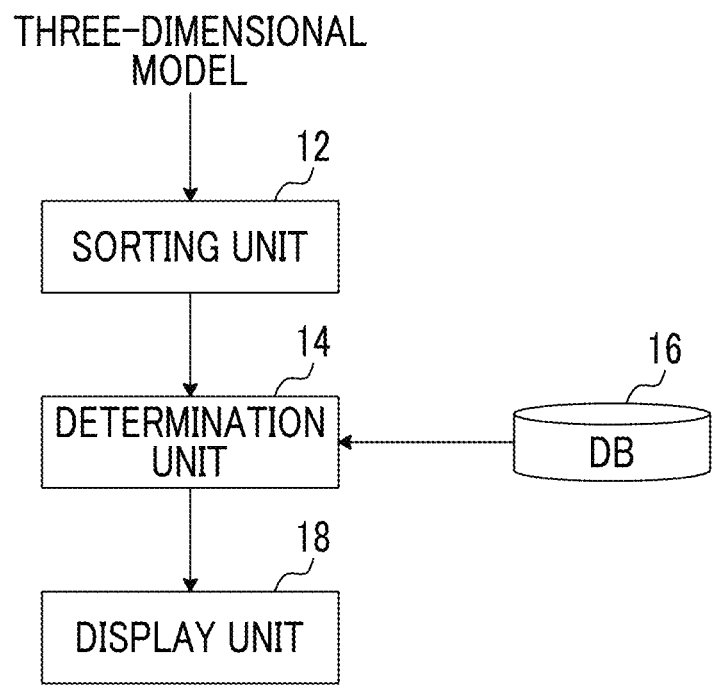
FIG. 3 is a functional block diagram showing the functional configuration of the design supporting apparatus according to the exemplary embodiment.

In a case where the CPU 10A loads a design supporting program, which is stored in the ROM 10B in advance, into the RAM 10C and executes the design supporting program, the design supporting apparatus 10 according to this exemplary embodiment realizes the functions shown in FIG. 3. FIG. 3 is a functional block diagram showing the functional configuration of the design supporting apparatus 10 according to the exemplary embodiment.

The design supporting apparatus 10 according to this exemplary embodiment has the functions of a sorting unit 12, a determination unit 14, and a display unit 18 as shown in FIG. 3.

Figure 4:
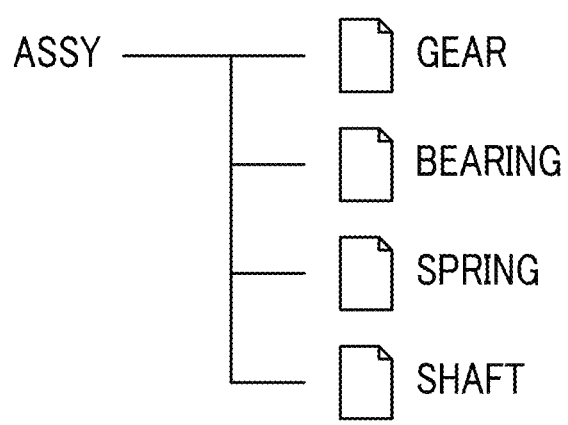
FIG. 4 is a diagram showing an example in which parts included in an assembly are sorted into different folders for each type.

The sorting unit 12 sorts the three-dimensional models of the respective parts included in an assembly, which is a module into which a plurality of parts are combined, for each type of parts in a step of designing a part. For example, as shown in FIG. 4, the sorting unit 12 sorts the respective parts of an assembly into different folders for each type. FIG. 4 is a diagram showing an example in which the respective parts included in the assembly are sorted into different folders for each type. An example in which the parts included in the assembly are sorted into "GEAR", "BEARING", "SPRING", and "SHAFT" is shown in the example shown in FIG. 4.

The determination unit 14 recognizes the shapes of the respective parts using the three-dimensional models and determines whether or not the respective parts meet predetermined requirements related to assemblability for each type of the parts. For example, the determination unit 14 stores predetermined requirements related to assemblability, such the prevention of an injury to a worker, the size of a part considering workability, the ease of assembly work, and the ease of phase alignment, in a database (DB) 16 in advance, and reads out the requirements to determines whether or not the parts meet the requirements.

The display unit 18 executes processing of displaying the results of the determination of the determination unit 14 for the respective parts included in the assembly on the display unit 18. For example, as shown in FIG. 5, the display unit 18 displays the results of determination for the part included in the assembly, which are obtained from the determination unit 14, for each requirement, and displays a portion not meeting the requirement in a display form different from the display forms of the other portions in a case where there is the portion not meeting the requirement so that the portion not meeting the requirement can be recognized. FIG. 5 is a diagram showing an example of the display of the results of the determination of the determination unit 14. FIG. 5 shows an example in which the list of check results is displayed on the left side as the results of the determination of whether or not the part meets requirements for assemblability and a shape represented by the three-dimensional model of the single part is displayed on the right side and a portion of the single part not meeting the requirements is displayed in a display form (a thick line in FIG. 5) different from the display forms of the other portions.

Here, an example of the results of determination for the requirements related to assemblability shown in FIG. 5 will be described. FIG. 6 is an enlarged view of the check results displayed on the left side in FIG. 5.

In the example shown in FIG. 6, the results of the determination of the determination unit 14 are shown as the check results and requirement IDs, requirement names, requirement contents, and results are displayed in a list. A diagram illustrating each item is displayed by "open" shown in FIG. 6.

Specifically, in a case where a requirement ID is "000010", a requirement name is "Preventing an injury to a worker". With regard to requirement contents, the result of "1. No sharp (less than 90°) edge" is "0" and the result of "2. Satisfying the followings in a case where there is a sharp (less than 90°) portion", "Ensuring a safe grip portion", and "Instructing R1 or more to be given to the tip of the sharp portion to be gripped, (Supplement) a portion to be touched by a customer should conform to SAFETY GUIDE" is "-".

Further, in a case where a requirement ID is "000020", a requirement name is "the size of a part considering workability". With regard to requirement contents, the result of "1. An outer diameter of φ 10 or more (recommended)" is "0" and the result of "2. Capable of performing grip/assembly work without requiring standard/specialized tools and the like" is "-".

Furthermore, in a case where a requirement ID is "000070", a requirement name is "Easy assembly work". With regard to requirement contents, the result of "1. No front/back and no directionality in a left-right direction" is "0" and the result of "2. Providing a measure for preventing reverse assembly in a case where there is directionality, (Specific example) a hollow shape and changing (ribs, rims, and bearing portions)" is "-".

Moreover, in a case where a requirement ID is "000090", a requirement name is "Easy phase alignment". With regard to requirement contents, the result of "1. Taking the following measure according to the type of a mating part" and "1-1. The mating part is a metal shaft: D-hole+mark for phase alignment (shape that can be recognized in appearance)" is "0", and the result of "1-2. The mating part is a resin shaft: double D-hole" is "0".

Further, in a case where a requirement ID is "000100", a requirement name is "Easy phase alignment". With regard to requirement contents, the result of "1. Mark for phase alignment (shape that can be recognized in appearance), (Supplement) arrow, Δ mark" is "0".

Furthermore, in a case where a requirement ID is "000110", a requirement name is "Easy phase alignment". With regard to requirement contents, the result of "1. D-shaft+mark for phase alignment (shape that can be recognized in appearance)" is "0", the result of "2. Double D-shaft" is "0", and the result of "3. A shaft-shaped portion that can be assembled since phase alignment with the mating part is not required, (Recommended example) employing a coupling method (BORUTO: 807E59530)" is "0".

Moreover, in a case where a requirement ID is "000130", a requirement name is "Easy positioning work". With regard to requirement contents, the result of "1. An inner diameter hole and a shaft tip portion (a shaft is formed on GEAR) correspond to the followings", "the part (inner diameter hole, shaft tip): C0.5 or more", "the shaft tip of the mating part (metal): C1.0 or more", "the shaft tip of the mating part (resin): C0.5 or more", and "(Supplement) please also refer to SHAFT requirements" is "1".

In the example shown in FIG. 6, a portion where the result is "1" is regarded as a non-conforming portion and is displayed in a display form, such as red, different from the display forms of the other portions. Further, a non-conforming position on a non-conforming part is displayed on the right side in FIG. 5 so as to be recognizable. Specifically, an example in which a position, which is shown by a thick line, on the part displayed on the right side in FIG. 5 is displayed in a display form different from the display forms of the other portions as a portion not meeting the requirements for assemblability is shown in the example shown in FIG. 5.

As the different display form, a part not meeting the requirements may be displayed in a more conspicuous display form than a part meeting the requirements. For example, display in a different color, display with hatching or the like, display with blinking, or the like is applied as the display form. Further, for example, display in a red color, display with blinking, or the like is applied as a conspicuous display form.

Furthermore, the display unit 18 may execute processing of displaying the results of determination for the respective parts of the assembly as a part list in addition to displaying the respective parts. FIG. 7 is a diagram showing an example in which the results of determination for the respective parts of the assembly are displayed as a part list. In FIG. 7, a user ID, a name, a sub, a part number, a file name, a category, and a modified portion are shown as a list.

Specifically, a user ID is "fx32182", a name is "YAMATANI HANAKO", a sub is "DRIVE", a part number is "987E01312", a file name is "BEARING_BRUSH", a category is "BEARING_013", and a modified portion is "0", so that this part meets the requirements.

Further, a user ID is "fx26101", a name is "FUJI TARO", a sub is "DRIVE", a part number is "807E62540", a file name is "GEAR_AUGER_CC", a category is "GEAR_807", and a modified portion is "1", so that this part does not meet the requirements.

Furthermore, a user ID is "fx26101", a name is "FUJI TARO", a sub is "DRIVE", a part number is "807E62421", a file name is "GEAR_CAM_1901", a category is "GEAR_807", and a modified portion is "1", so that this part does not meet the requirements.

Moreover, a user ID is "fx26101", a name is "FUJI TARO", a sub is "DRIVE", a part number is "TBD", a file name is "GEAR_DRIVE_ESE", a category is "GEAR_807", and a modified portion is "1", so that this part does not meet the requirements.

Further, a user ID is "fx26101", a name is "FUJI TARO", a sub is "DRIVE", a part number is "013E42630", a file name is "BEARING_BRUSH", a category is "BEARING_013", and a modified portion is "0", so that this part meets the requirements.

Furthermore, a user ID is "fx26101", a name is "FUJI TARO", a sub is "DRIVE", a part number is "013E49810", a file name is "BEARING_GEAR_", a category is "BEARING_013", and a modified portion is "0", so that this part meets the requirements.

Moreover, a user ID is "fx26101", a name is "FUJI TARO", a sub is "DRIVE", a part number is "013E49650", a file name is "BEARING_BTR_1S", a category is "BEARING_013", and a modified portion is "0", so that this part meets the requirements.

Further, a user ID is "fx32182", a name is "YAMATANI HANAKO", a sub is "Other", a part number is "123E045678", a file name is "GEAR_IDLE_DISP", a category is "GEAR_007", and a modified portion is "0", so that this part meets the requirements.

Furthermore, a user ID is "fx32182", a name is "YAMATANI HANAKO", a sub is "Other", a part number is "234E056789", a file name is "GEAR_SEAL_", a category is "GEAR_007", and a modified portion is "0", so that this part meets the requirements.

An example in which three parts of which the modified portions are "1" and which are shown by hatching do not meet the requirements and are displayed in a display form different from the display forms of the other parts is shown in the example shown in FIG. 7. For example, display in a different color, display with hatching or the like, display with blinking, or the like is applied as the different display form.

An example in which the results of determination for the respective parts of the assembly are collectively displayed as a part list and the parts meeting the requirements and the parts not meeting the requirements are displayed respectively is shown in FIG. 7, but the display of a part list is not limited thereto. For example, only the parts, which do not meet the requirements and are displayed in the hatched portions in FIG. 7, may be displayed so that only the parts not meeting the requirements in the part list are collectively displayed.

Figure 8:
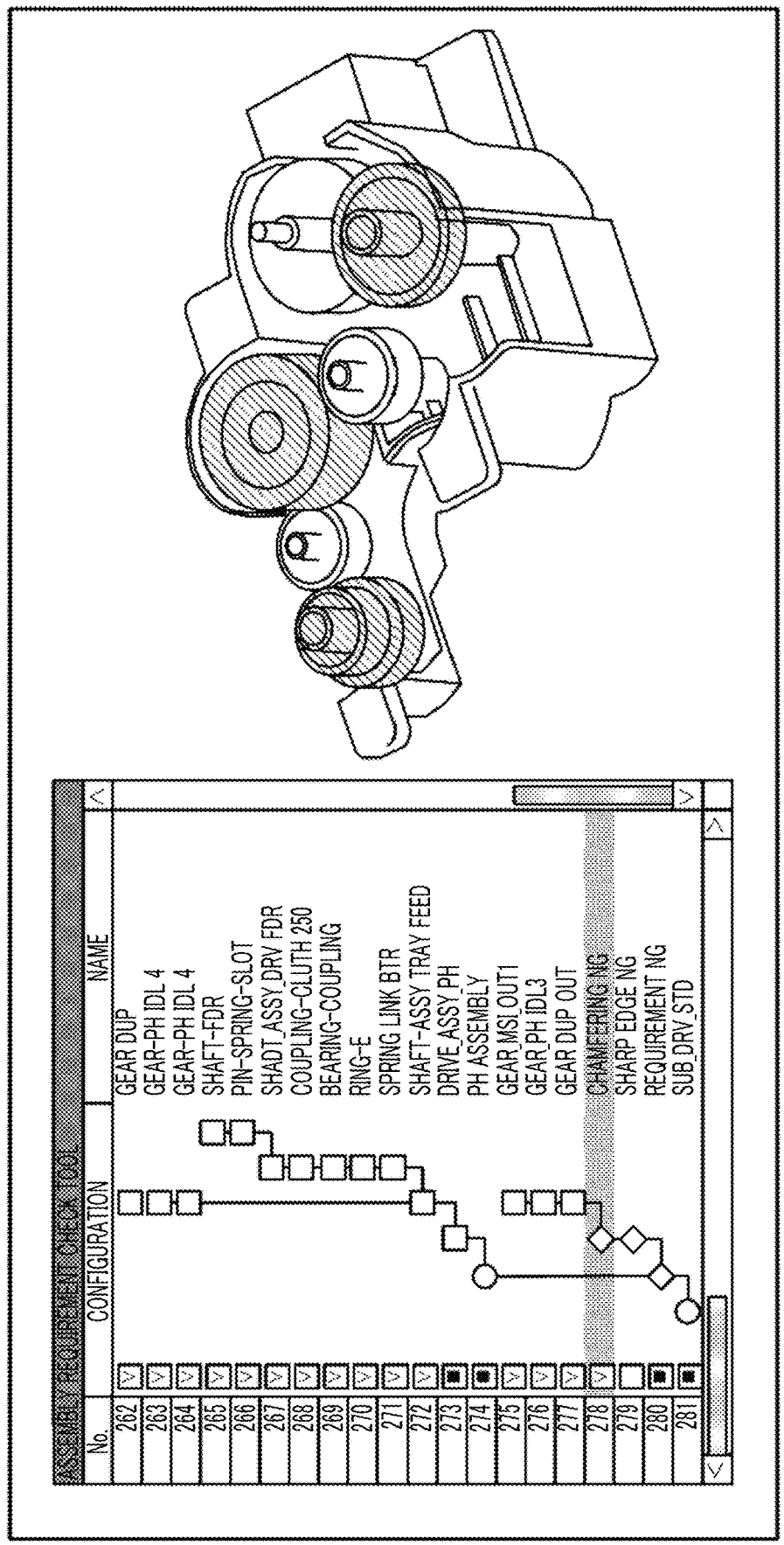
FIG. 8 is a diagram showing an example in which the shapes of the respective parts represented by three-dimensional models are displayed in a display form according to the results of the determination of whether or not the respective parts meet requirements for assemblability.

Further, the display unit 18 may display the shape of the assembly represented by the three-dimensional model in addition to the results of the determination and the parts described above, and may display the shape of each part represented by the three-dimensional model in a display form according to the results of the determination of whether or not the part meets the requirements for assemblability. For example, as shown in FIG. 8, the respective parts of the assembly may be displayed by three-dimensional images and parts not meeting the requirements for assemblability may be displayed in a display form different from the display forms of the other parts. FIG. 8 is a diagram showing an example in which the shapes of the respective parts represented by three-dimensional models are displayed as three-dimensional images in a display form according to the results of the determination of whether or not the respective parts meet requirements for assemblability. An example in which a part of which the part name is "GEAR" and which does not meet the "chamfering check" of assembly requirements is shown by hatching is shown in the example shown in FIG. 8.

In a case where whether or not each part meets the requirement for assemblability is checked, the selection result for a part to be check and requirements displaying the results of the determination of whether or not the part meets the requirements for assemblability are received and the results of the determination for the received requirements are displayed. For example, as in the window of "assembly requirement check tool" shown in FIG. 8, requirements for assemblability, which display the results of the determination of whether or not the part meets the requirements for assemblability such as "assembly requirements", may be made selectable, the selection result may be received, and the results of the determination for the requirements for assemblability may be displayed. Even with regard to the display of the check results of FIG. 5 and the part list of FIG. 7, requirements for assemblability may be made selectable, the selection result may be received, and the results of the determination for the received requirements for assemblability may be displayed.

Subsequently, the details of a method of determining whether or not a part meets requirements by the determination unit 14 will be described using an example.

Figure 9:
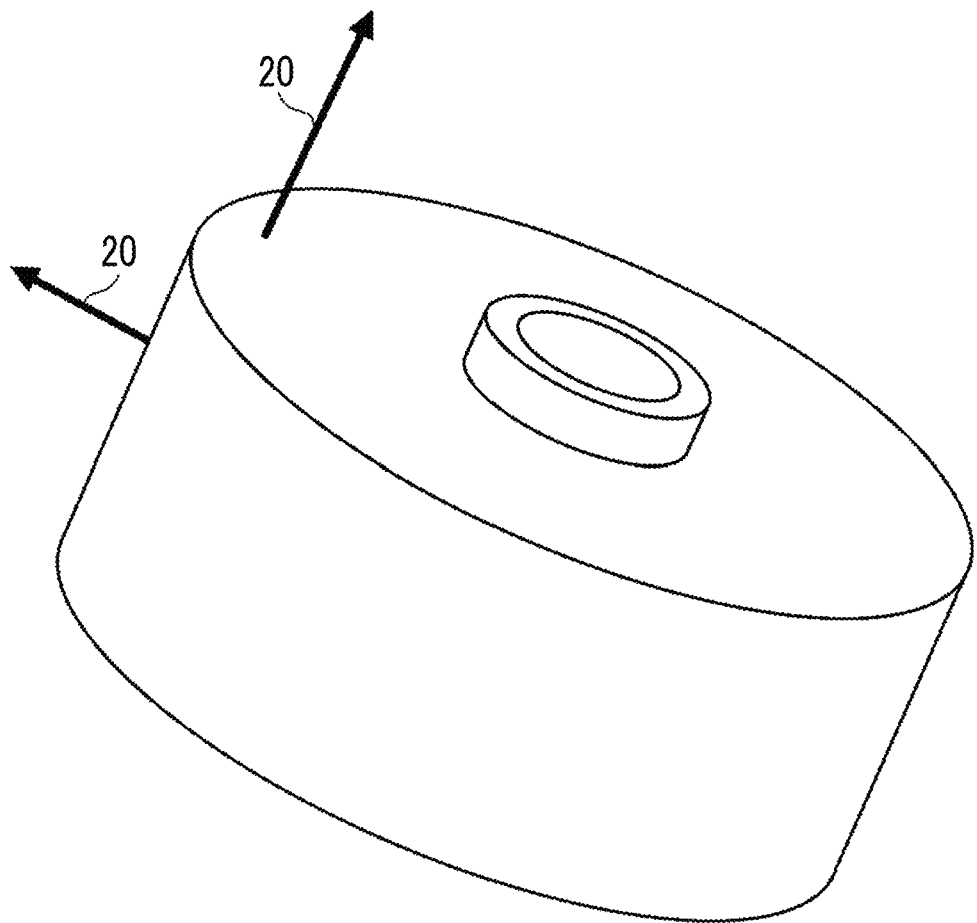
FIG. 9 is a diagram illustrating a specific determination method for "1. No sharp (less than 90°) edge"

A specific determination method for "1. No sharp (less than 90°) edge" of "Preventing an injury to a worker", which is the requirement name of the above-mentioned requirement ID "000010", will be described first. FIG. 9 is a diagram illustrating the specific determination method for "1. No sharp (less than 90°) edge".

With regard to "1. No sharp (less than 90°) edge", an edge is recognized and an error is displayed in a case where the edge has an angle less than 90°.

With regard to the detection of a sharp edge, an edge is extracted from a three-dimensional model and faces adjacent to the edge of the three-dimensional model are recognized.

Next, as shown in FIG. 9, normal vectors 20 to the respective recognized faces are recognized and the angle of the edge is recognized from an angle between the respective normal vectors 20.

Then, an error is displayed in a case where the recognized angle of the edge is less than 90°. An example in which the normal vectors 20 to two faces are recognized is shown in FIG. 9.

Figure 10:
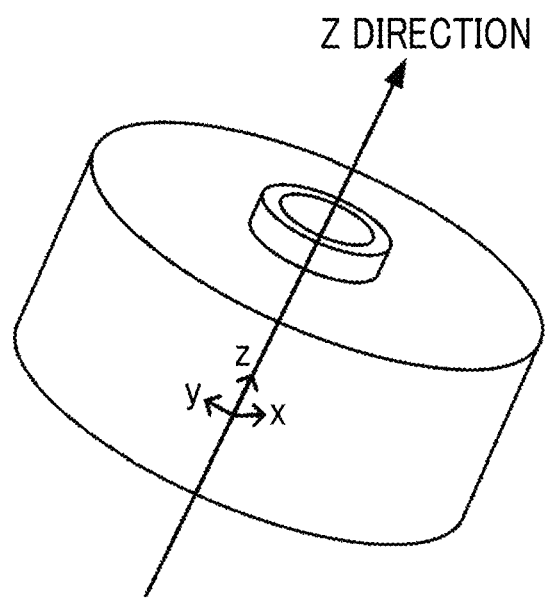
FIG. 10 is a diagram showing an example in which the center of a three-dimensional model is moved to the origin.
Figure 11:
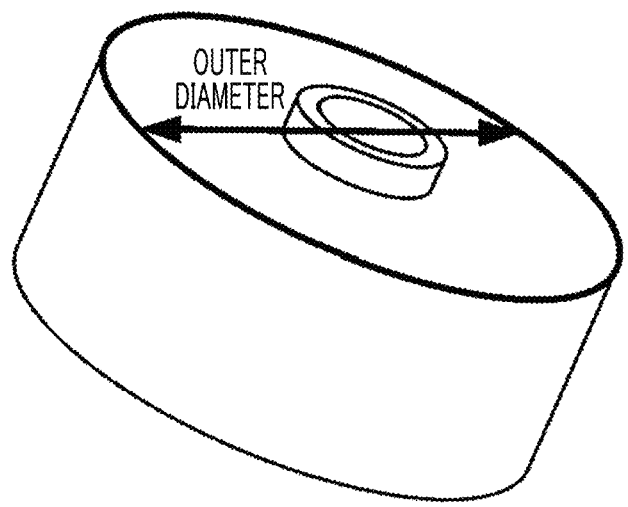
FIG. 11 is a diagram illustrating an outer diameter in a case where a cylindrical surface goes around.
Figure 12:
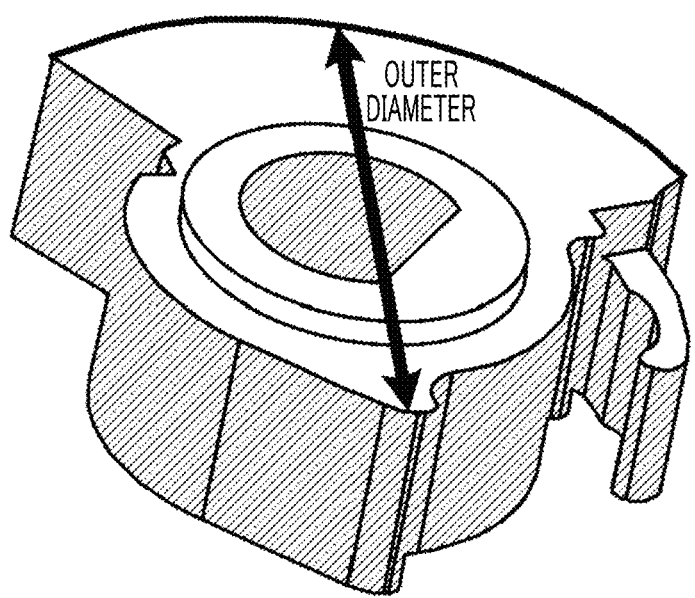
FIG. 12 is a diagram illustrating an outer diameter in a case where the cylindrical surface does not go around.

Subsequently, a specific determination method for "1. An outer diameter of φ 10 or more (recommended)" of "the size of a part considering workability", which is the requirement name of the requirement ID "000020", will be described. FIGS. 10 to 12 are diagrams illustrating the specific determination method for "1. An outer diameter of φ 10 or more (recommended)", FIG. 10 is a diagram showing an example in which the center of a three-dimensional model is moved to the origin, FIG. 11 is a diagram illustrating an outer diameter in a case where a cylindrical surface goes around, and FIG. 12 is a diagram illustrating an outer diameter in a case where the cylindrical surface does not go around.

With regard to "1. An outer diameter of φ 10 or more (recommended)", an outer diameter is recognized and an error is displayed in a case where the outer diameter is less than φ 10.

With regard to the detection of an outer diameter, as shown in FIG. 10, the center of a three-dimensional model is moved to the origin, the axis of the three-dimensional model is made to coincide with a z direction, and a cylindrical surface having the maximum radius is recognized. A z axis is one axis in the three dimensions of x, y, and z.

Then, in a case where the cylindrical surface goes around, a diameter is regarded as an outer diameter as shown by a thick line of FIG. 11. In a case where the outer diameter is less than φ 10, an error is displayed.

Further, in a case where the cylindrical surface does not go around, an edge, which is positioned in the same plane as the edge of a cylinder and has the maximum distance from the edge of the cylinder as shown by a thick line of FIG. 12, is recognized and the distance is regarded as an outer diameter. In a case where the outer diameter is less than φ 10, an error is displayed.

Figure 13:
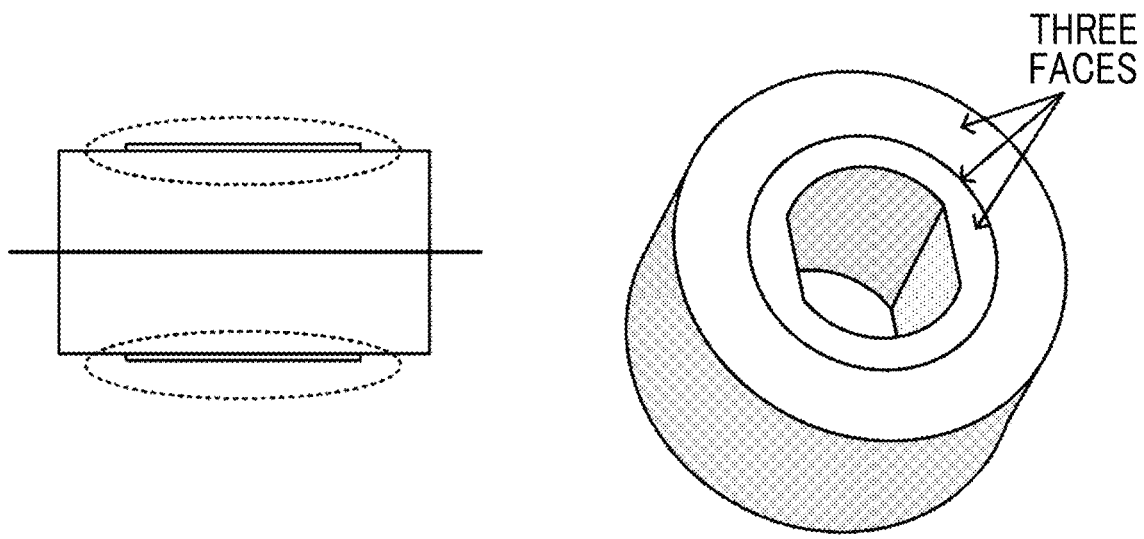
FIG. 13 is a diagram illustrating a specific determination method for "1. No front/back and no directionality in a left-right direction"

Subsequently, a specific determination method for "1. No front/back and no directionality in a left-right direction" of "Easy assembly work", which is the requirement name of the requirement ID "000070", will be described. FIG. 13 is a diagram illustrating a specific determination method for "1. No front/back and no directionality in a left-right direction".

With regard to "1. No front/back and no directionality in a left-right direction", the positions of faces are recognized with respect to the center of a three-dimensional model and an error is displayed in a case where there is no face symmetric with respect to an xy plane.

With regard to the recognition of the positions of faces, the center of the three-dimensional model is moved to the origin, the axis of the three-dimensional model is made to coincide with a z direction, and faces positioned on the upper and lower sides with respect to the center of the three-dimensional model are sorted and listed as shown on the left side in FIG. 13 by a dotted line.

Then, it is verified whether or not the number of the faces and the positions of the faces match, and an error is displayed in a case where the number of the faces and the positions of the faces so not match. An example in which the number of the faces is 3 is shown on the right side in FIG. 13.

Figure 14:
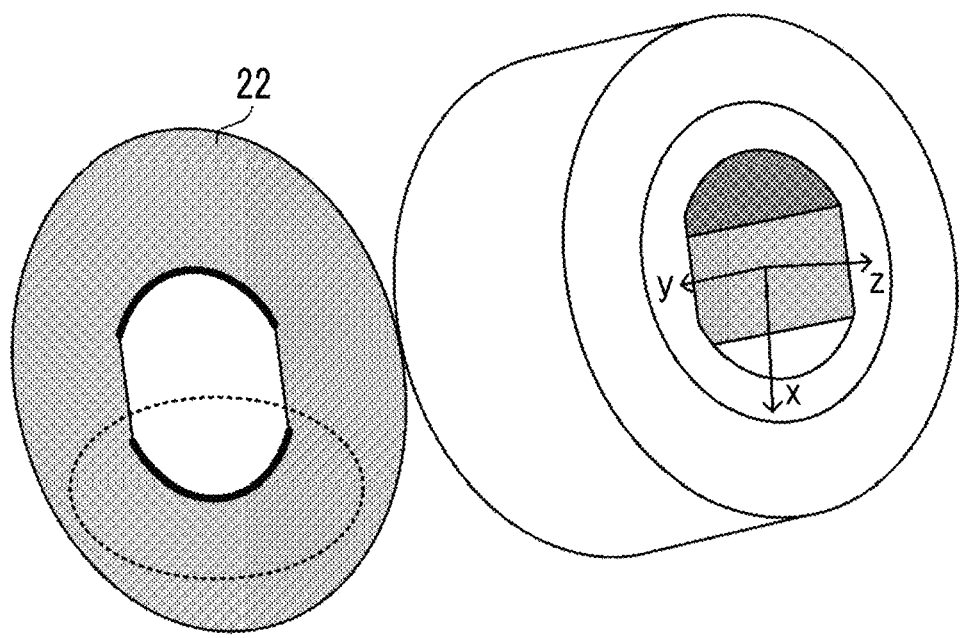
FIG. 14 is a diagram illustrating a method of detecting a D-hole in "Easy phase alignment"

Subsequently, a specific determination method for "Easy phase alignment", which is the requirement name of the requirement ID "000090", will be described. FIG. 14 is a diagram illustrating a method of detecting a D-hole in "Easy phase alignment". A D-hole is a D-shaped hole including arcs and straight lines, and a double D-hole is a hole having a shape in which two D-holes are combined with each other.

With regard to the D-hole in "Easy phase alignment", a D-hole and a double D-hole are recognized and an error is displayed in a case where there is a D-hole.

With regard to the detection of a D-hole, the center of a three-dimensional model is moved to the origin, the axis of the three-dimensional model is made to coincide with a z direction, and a projection plane 22 is created in a z direction as shown in FIG. 14.

Then, a curved line of the projection plane 22 shown by a dotted line of FIG. 14 is recognized, a curved line of which the radius of curvature is equal to the minimum radius is extracted, a hole is recognized as a D-hole in a case where the ratio of the curved line is in the range of 60% to 90%, and a hole is recognized as a double D-hole in a case where there are two same shapes having a ratio of the curved line in the range of 10% to 45%. In an example shown in FIG. 14, curved lines shown by a thick line are extracted and an example of a double D-hole, which includes two shapes of which a ratio of the curved line is 40%, is shown.

Figure 15:
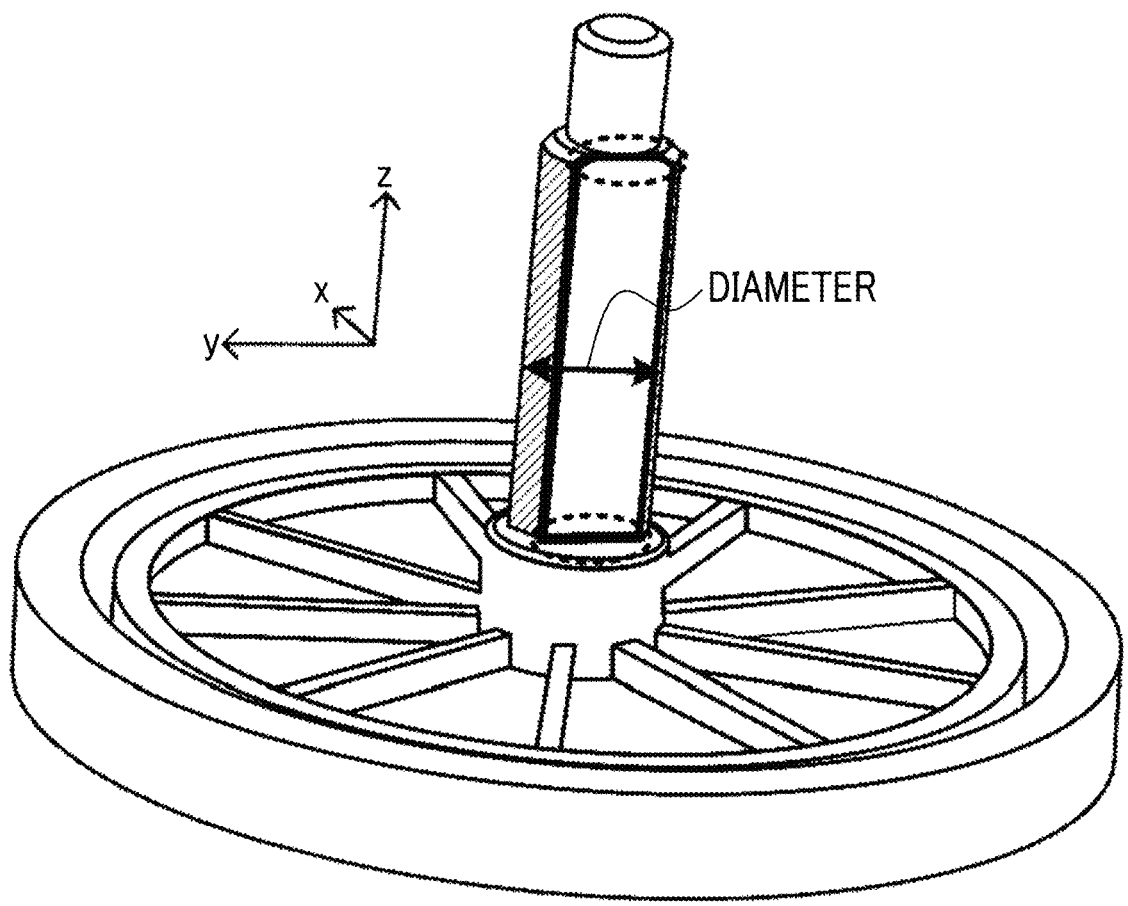
FIG. 15 is a diagram illustrating a method of detecting a D-shaft in "Easy phase alignment"

Subsequently, a specific determination method for "Easy phase alignment" of the requirement ID "000100" will be described. FIG. 15 is a diagram illustrating a method of detecting a D-shaft in "Easy phase alignment". A D-shaft is a D-shaped shaft including arcs and straight lines, and a double D-shaft is a shaft having a shape in which two D-shafts are combined with each other.

With regard to the D-shaft in "Easy phase alignment", a D-shaft and a double D-shaft are recognized and an error is displayed in a case where there is a D-shaft.

With regard to the detection of a D-shaft, as shown in FIG. 15, the center of a three-dimensional model is moved to the origin, the axis of the three-dimensional model is made to coincide with a z direction, and an outward cylinder, which is shown by the hatching of FIG. 15 and has the same axis as an outermost diameter, is recognized.

Then, edges of the adjacent face of the cylinder are recognized, a linear straight line shown by a thick line of FIG. 15 and perpendicular to the z axis is extracted, the length of the linear straight line is recognized, and the linear straight line is added to a list in a case where the length of the linear straight line is equal to or shorter than the diameter of the cylinder.

After that, in a case where there is one list, a shaft is determined as a D-shaft. In a case where there are two lists, the positions of the linear straight lines are acquired. In a case where the acquired positions are symmetric with respect to the z axis, a shaft is determined as a double D-shaft. In a case where the acquired positions are different from each other, both shafts are determined as D-shafts.

Figure 16:
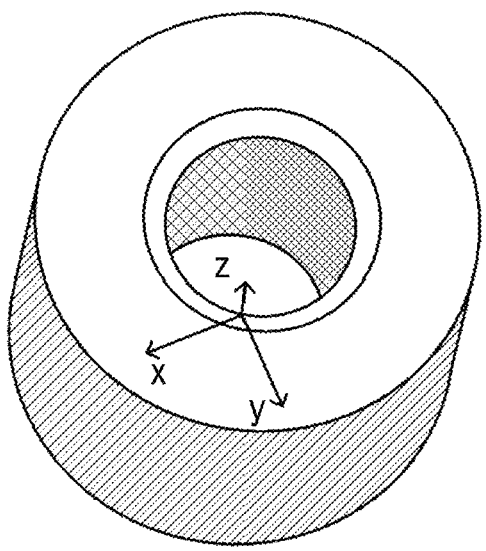
FIG. 16 is a diagram showing an example in which the center of a three-dimensional model is moved to the origin.
Figure 17:
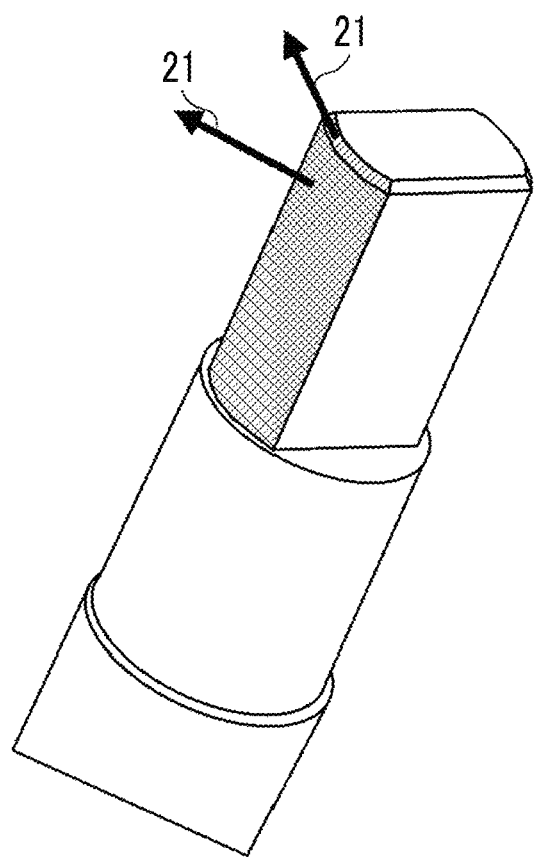
FIG. 17 is a diagram showing a case where normals to a cylindrical surface face outward.
Figure 18:
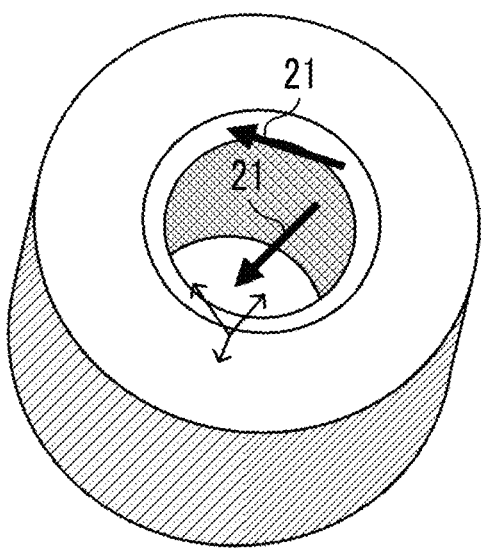
FIG. 18 is a diagram showing a case where normals to a cylindrical surface face inward.

Subsequently, a specific determination method for "inner diameter hole and shaft tip portion" of "Easy positioning work" of requirement ID "000130" will be described. FIGS. 16 to 18 are diagrams illustrating the specific determination method for "inner diameter hole and shaft tip portion" of "Easy positioning work". FIG. 16 is a diagram showing an example in which the center of a three-dimensional model is moved to the origin, FIG. 17 is a diagram showing a case where normals to a cylindrical surface face outward, and FIG. 18 is a diagram showing a case where normals to a cylindrical surface face inward.

With regard to "inner diameter hole and shaft tip portion" of "Easy positioning work", an inner diameter hole and a shaft tip portion are recognized and an error is displayed in the case of C0.5 or less.

With regard to the recognition of the inner diameter hole and the shaft tip, as shown in FIG. 16, the center of a three-dimensional model is moved to the origin, the axis of the three-dimensional model is made to coincide with a z direction, and a cylinder having the minimum radius is recognized.

Then, in a case where normals 21 to a cylindrical surface face outward as shown in FIG. 17, faces adjacent to both ends are recognized. In a case where an angle between any one of both ends and a face adjacent to the cylinder is 450 and the height of the adjacent face is 0.5 or more, the adjacent face is recognized as a C-face.

Further, in a case where normals 21 to a cylindrical surface face inward as shown in FIG. 18, a beam is emitted from the center of a cylinder in an axial direction and it is determined whether a beam is emitted to one side or both sides. In a case where an angle between the cylindrical surface and an adjacent face is 45° and the height of the adjacent face is 0.5 or more, the adjacent face is recognized as a C-face. In a case where the C-face is 0 on one side and in a case where the C-face is 1 on both sides, an error is displayed.

Figure 19:
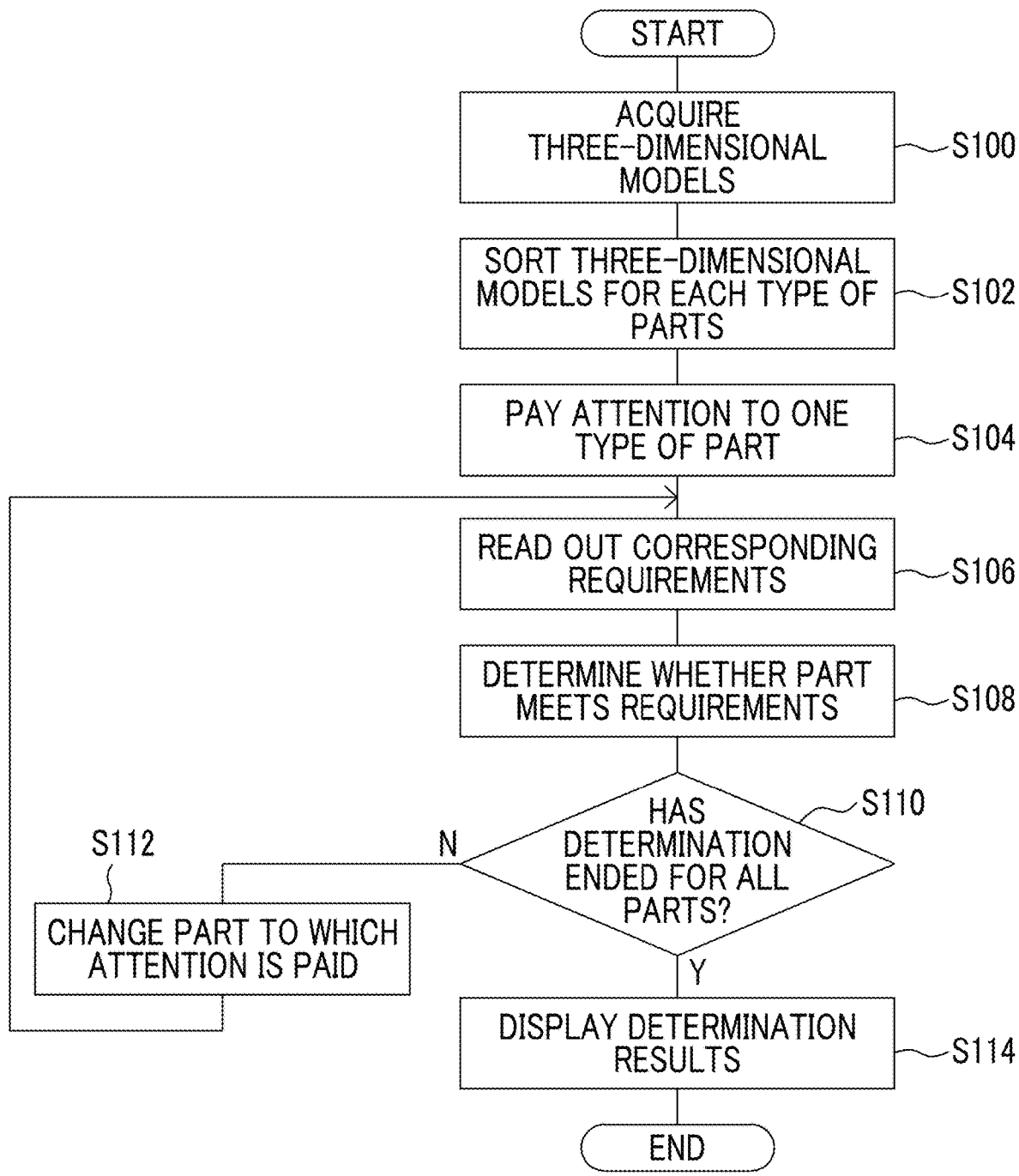
FIG. 19 is a flowchart showing an example of the flow of processing that is executed by the design supporting apparatus according to this exemplary embodiment.

Subsequently, specific processing, which is executed by the design supporting apparatus 10 according to this exemplary embodiment having the above-mentioned configuration, will be described. FIG. 19 is a flowchart showing an example of the flow of the processing that is executed by the design supporting apparatus 10 according to this exemplary embodiment. The processing shown in FIG. 19 is started in a case where an operation for giving an instruction to start the determination of whether or not a part meets the requirements for assemblability is performed.

The CPU 10A acquires three-dimensional models that are objects used to determine whether or not the three-dimensional models meet the requirements for assemblability in Step S100, and proceeds to Step S102. For example, the CPU 10A acquires three-dimensional models from a database in which the three-dimensional models of an assembly used to determine whether or not the three-dimensional models meet the requirements for assemblability are stored.

The CPU 10A sorts the acquired three-dimensional models for each type of the parts in Step S102, and proceeds to Step S104. That is, the sorting unit 12 sorts the three-dimensional models of the respective parts, which are included in the assembly in which a plurality of parts are combined, for each type of the parts. For example, as shown in FIG. 4, the sorting unit 12 sorts the respective parts, which are included in the assembly, into different folders for each type.

The CPU 10A pays attention to one type of part included in the assembly in Step S104, and proceeds to Step S106.

The CPU 10A reads out requirements corresponding to the type of part to which the CPU 10A pays attention in Step S106, and proceeds to Step S108. That is, the determination unit 14 reads out requirements, which are related to assemblability corresponding to the type of part to which the CPU 10A pays attention, from the DB 16.

The CPU 10A determines whether or not the part meets the requirements in Step S108, and proceeds to Step S110. That is, the determination unit 14 recognizes the shape of the part to which the CPU 10A pays attention using the three-dimensional model, and determines whether or not the respective parts meet predetermined requirements related to assemblability for each type of the parts according to the respective determination methods having been mentioned above.

In Step S110, the CPU 10A determines whether or not the determination has ended for all the parts of the assembly. In a case where the determination is denied, the CPU 10A proceeds to Step S112. In a case where the determination is affirmed, the CPU 10A proceeds to Step S114.

The CPU 10A changes the part to which the CPU 10A pays attention in Step S112, returns to Step S106 described above, and repeats the above-mentioned processing.

The CPU 10A displays the results of determination on the display unit 18 in Step S114 and ends a series of processing. That is, the display unit 18 executes processing of displaying the results of the determination of the determination unit 14 on the display unit 18 for each part included in the assembly. For example, a user selects a part to be checked, and the design supporting apparatus 10 receives a selection result and displays the results of determination for the part to be checked. In this case, as shown in FIG. 6, the display unit 18 displays the results of determination for the part included in the assembly, which are obtained from the determination unit 14, for each requirement, and displays a portion not meeting the requirement in a display form different from the display forms of the other portions in a case where there is a portion not meeting the requirement so that the portion not meeting the requirement can be recognized. Alternatively, as shown in FIG. 7, the display unit 18 may display the results of determination for the respective parts of an assembly as a part list. Alternatively, the display unit 18 may display part lists for each assembly and may collectively display parts that do not meet the requirements. Alternatively, as shown in FIG. 8, the display unit 18 may display an assembly and may display the parts of the assembly, which do not meet the requirements, in a display form different from the display forms of the parts that meets the requirements.

Figure 20:
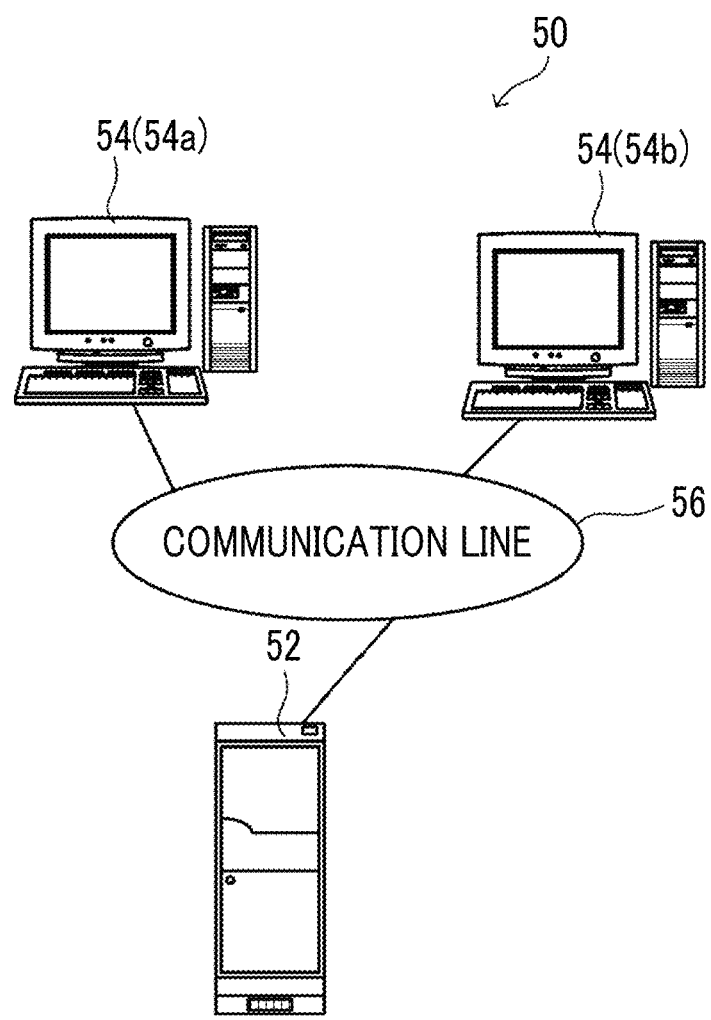
FIG. 20 is a diagram showing an example of the schematic configuration of a design supporting system that includes a cloud server and a client terminal.

An example in which a PC is applied as one example of the design supporting apparatus 10 has been described in the exemplary embodiment, but the design supporting apparatus is not limited thereto. For example, a design supporting system 50 including a cloud server 52 and client terminals 54 may be provided as shown in FIG. 20. Further, the functional configuration shown in FIG. 3 may be provided in a cloud server, and the cloud server 52 may provide a design supporting service, which verifies whether or not a part meets the requirements for assemblability, as a cloud service. In this case, the configuration of a general computer including a CPU is applied to the cloud server 52 and the client terminal 54 as in the design supporting apparatus 10 shown in FIG. 2. The design supporting system 50 shown in FIG. 20 includes the cloud server 52 and the plurality of client terminals 54a and 54b, and each of the cloud server 52 and the plurality of client terminals 54a and 54b is connected to a communication line 56. An example in which the plurality of (two in FIG. 20) client terminals 54 is shown in FIG. 20, but one client terminal 54 may be provided or three or more client terminal 54 may be provided. Further, a personal computer may be applied as the client terminal 54, or a mobile terminal, such as a tablet terminal or a smartphone, may be applied as the client terminal 54. Alternatively, only the DB 16 may be provided in the cloud server 52, the plurality of client terminals 54 are used as the design supporting apparatuses 10, and the DB 16 may be shared by the respective design supporting apparatuses 10. Alternatively, some functions among the functions shown in FIG. 3 may be provided in the cloud server 52 and the functions provided in the cloud server 52 may be used from the client terminal 54.

Further, a part not meeting the requirements for assemblability is displayed in a display form different from the display form of a part meeting the requirements for assemblability in the exemplary embodiment, and the present invention is not limited thereto. Only the results of the determination of whether or not a part meets the requirements for assemblability may be displayed.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Furthermore, the processing executed by the design supporting apparatus 10 according to the exemplary embodiment may be processing executed by software, processing executed by hardware, or processing that is a combination of both processing. Moreover, the processing executed by the design supporting apparatus 10 may be stored in a storage medium as a program and distributed.

Further, it goes without saying that the present invention is not limited to the above description and may include various modifications without departing from the scope of the present invention in addition to the above description.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A design supporting apparatus comprising:
    a processor configured to:
    sort three-dimensional models of respective parts included in a module where a plurality of parts are combined for each type of the parts;
    execute processing of displaying results of determination of whether or not the respective parts meet predetermined requirements related to assemblability for each type of the parts, the results being determined using the three-dimensional models, for each part in predetermined display forms according to the results of the determination; and
    display a part not meeting the requirements in a display form different from a display form of a part meeting the requirements.

2. The design supporting apparatus according to claim 1, wherein the processor is configured to:
    display the part not meeting the requirements in a more conspicuous display form than the part meeting the requirements, as the different display form.

3. The design supporting apparatus according to claim 2, wherein the processor is configured to:
    display a shape of the module represented by the three-dimensional models, and display shapes of the respective parts represented by the three-dimensional models in the display forms according to the results of the determination.

4. The design supporting apparatus according to claim 2, wherein the processor is configured to:
collectively display the results of the determination for the respective parts of the module as a part list.

5. The design supporting apparatus according to claim 4, wherein the processor is configured to:
collectively display only parts not meeting the requirements in the part list.

6. The design supporting apparatus according to claim 2, wherein the processor is configured to:
receive the requirements displaying the results of the determination, and
display the results of the determination for the received requirements.

7. The design supporting apparatus according to claim 1, wherein the processor is configured to:
display a shape represented by the three-dimensional model of a single part, and
display a portion of the single part not meeting the requirements in a display form different from a display form of the other portion of the single part.

8. The design supporting apparatus according to claim 7, wherein the processor is configured to:
receive the requirements displaying the results of the determination, and
display the results of the determination for the received requirements.

9. The design supporting apparatus according to claim 1, wherein the processor is configured to:
display a shape of the module represented by the three-dimensional models, and
display shapes of the respective parts represented by the three-dimensional models in the display forms according to the results of the determination.

10. The design supporting apparatus according to claim 9, wherein the processor is configured to:
receive the requirements displaying the results of the determination, and
display the results of the determination for the received requirements.

11. The design supporting apparatus according to claim 1, wherein the processor is configured to:
collectively display the results of the determination for the respective parts of the module as a part list.

12. The design supporting apparatus according to claim 11, wherein the processor is configured to:
collectively display only parts not meeting the requirements in the part list.

13. The design supporting apparatus according to claim 1, wherein the processor is configured to:
receive the requirements displaying the results of the determination, and
display the results of the determination for the received requirements.

14. A design supporting system comprising:
a server that sorts three-dimensional models of respective parts included in a module where a plurality of parts are combined for each type of the parts and outputs results of determination of whether or not the respective parts meet predetermined requirements related to assemblability for each type of the parts, the results being determined using the three-dimensional models; and
a client terminal that executes processing of displaying the results of the determination for each part in predetermined display forms according to the results of the determination, and processing of displaying a part not meeting the requirements in a display form different from a display form of a part meeting the requirements.

15. A non-transitory computer readable medium storing a design supporting program causing a computer to execute a process comprising:
sorting three-dimensional models of respective parts included in a module where a plurality of parts are combined for each type of the parts; and
displaying results of determination of whether or not the respective parts meet predetermined requirements related to assemblability for each type of the part, the results being determined using the three-dimensional models, for each part in predetermined display forms according to the results of the determination; and
displaying a part not meeting the requirements in a display form different from a display form of a part meeting the requirements.

* * * * *